US011091320B2

(12) United States Patent
King et al.

(10) Patent No.: US 11,091,320 B2
(45) Date of Patent: *Aug. 17, 2021

(54) TRANSPORT SYSTEM POWERED BY SHORT BLOCK LINEAR SYNCHRONOUS MOTORS

(71) Applicant: MagneMotion, Inc., Devens, MA (US)

(72) Inventors: Nathanael N. King, Somerville, MA (US); Brian M. Perreault, Stow, MA (US); Tracy M. Clark, Devens, MA (US); Richard D. Thornton, Concord, MA (US); Jason Young, Devens, MA (US); Michael W. Bottasso, Maynard, MA (US)

(73) Assignee: MagneMotion, Inc., Devens, MA (US)

( * ) Notice: Subject to any disclaimer, the term of this patent is extended or adjusted under 35 U.S.C. 154(b) by 340 days.

This patent is subject to a terminal disclaimer.

(21) Appl. No.: 16/173,762

(22) Filed: Oct. 29, 2018

(65) Prior Publication Data

US 2019/0062062 A1 Feb. 28, 2019

Related U.S. Application Data

(63) Continuation of application No. 15/096,974, filed on Apr. 12, 2016, now Pat. No. 10,112,777, which is a continuation of application No. 14/143,802, filed on Dec. 30, 2013, now Pat. No. 9,346,371, which is a continuation of application No. 12/359,022, filed on Jan. 23, 2009, now Pat. No. 8,616,134.

(51) Int. Cl.
| | |
|---|---|
| *B65G 19/02* | (2006.01) |
| *B60L 13/00* | (2006.01) |
| *B60L 13/10* | (2006.01) |
| *B60L 13/03* | (2006.01) |
| *B65G 35/06* | (2006.01) |
| *B65G 54/02* | (2006.01) |
| *H02K 41/03* | (2006.01) |

(52) U.S. Cl.
CPC ............ *B65G 19/02* (2013.01); *B60L 13/003* (2013.01); *B60L 13/03* (2013.01); *B60L 13/10* (2013.01); *B65G 35/06* (2013.01); *B65G 54/02* (2013.01); *H02K 41/031* (2013.01); *B60L 2200/26* (2013.01)

(58) Field of Classification Search
CPC ........ B60L 11/00; B60L 11/002; B60L 13/00; B60L 13/006; B60L 13/04; B60L 13/16; B60L 15/00; B60L 15/002; B60M 1/00; B60M 1/02; B60M 1/16; B60M 1/30; B65G 19/00; B65G 19/02
See application file for complete search history.

(56) References Cited

U.S. PATENT DOCUMENTS

| | | | | |
|---|---|---|---|---|
| 8,616,134 B2 * | 12/2013 | King | ...................... | B65G 54/02 104/284 |
| 2007/0283841 A1 * | 12/2007 | Lopatinsky | ............ | A63H 18/08 104/284 |

\* cited by examiner

*Primary Examiner* — Robert J McCarry, Jr.
(74) *Attorney, Agent, or Firm* — Fletcher Yoder, P.C.

(57) ABSTRACT

Aspects of the invention provide a transport system powered by short block Linear Synchronous Motors (LSMs). The use of short blocks allows vehicles to move under precise control even when they are in close proximity to each other. The design allows the vehicles to be propelled and guided while negotiating sharp turns and negotiating merge and diverge switches. A coreless LSM can be used to create propulsive force without attractive force so as to allow a relatively high drag vehicle suspension, such as a vehicle sliding on a smooth surface.

20 Claims, 14 Drawing Sheets

Straight guideway showing vehicles moving in close proximity.

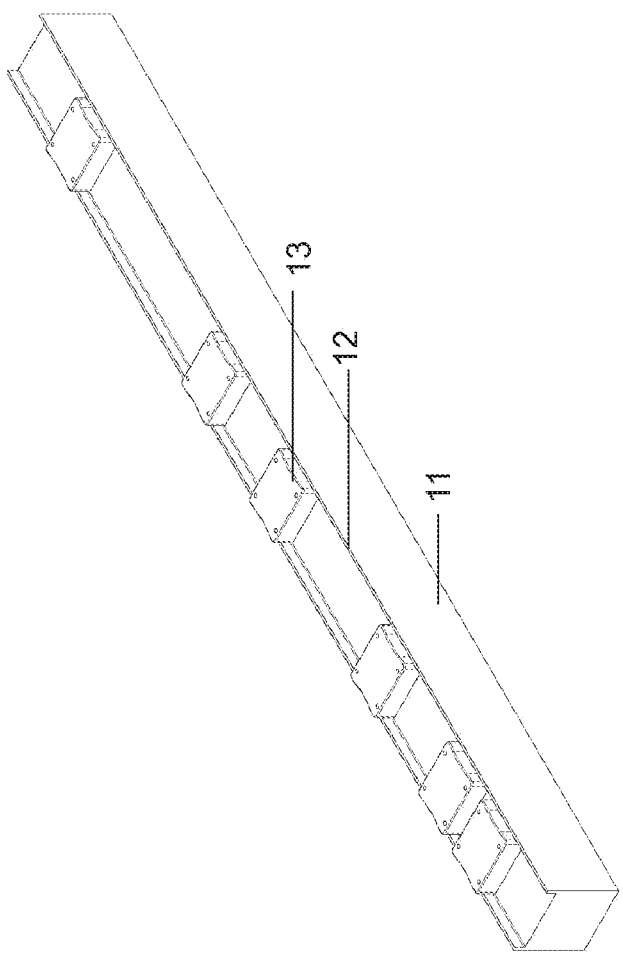
Figure 1. Straight guideway showing vehicles moving in close proximity.

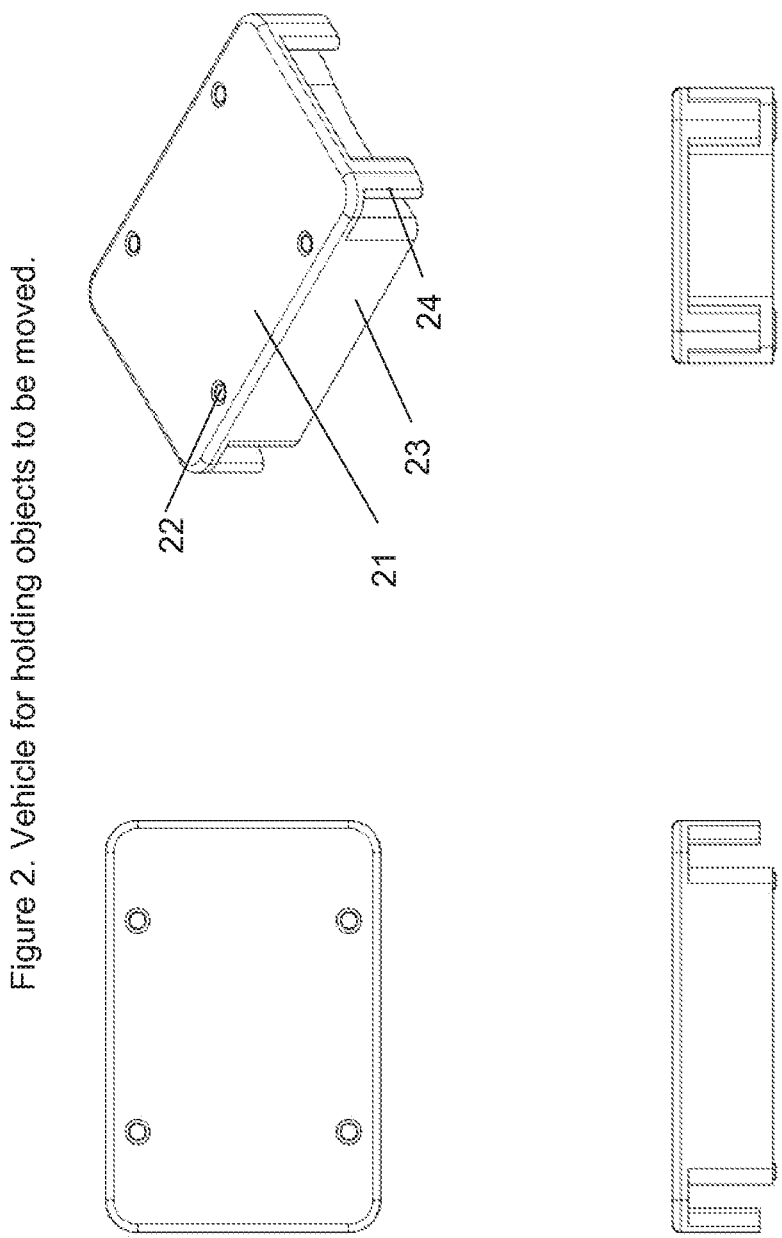
Figure 2. Vehicle for holding objects to be moved.

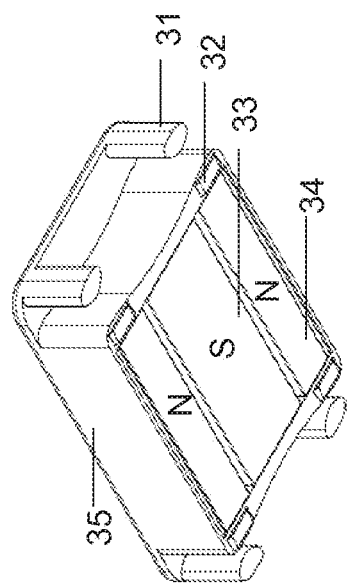
Figure 3. Vehicle showing switch guidance mechanisms and magnet array.

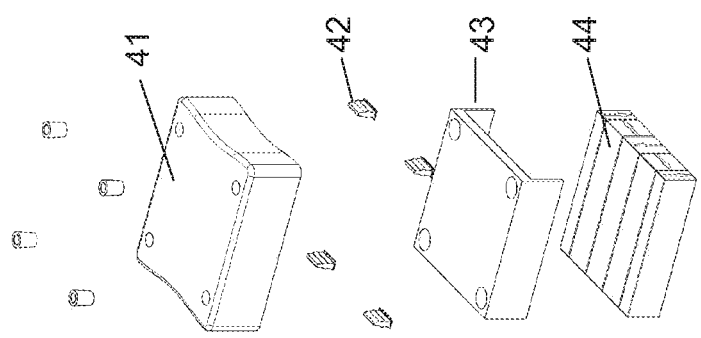
Figure 4. Cutaway view of vehicle showing magnets in a Halbach Array

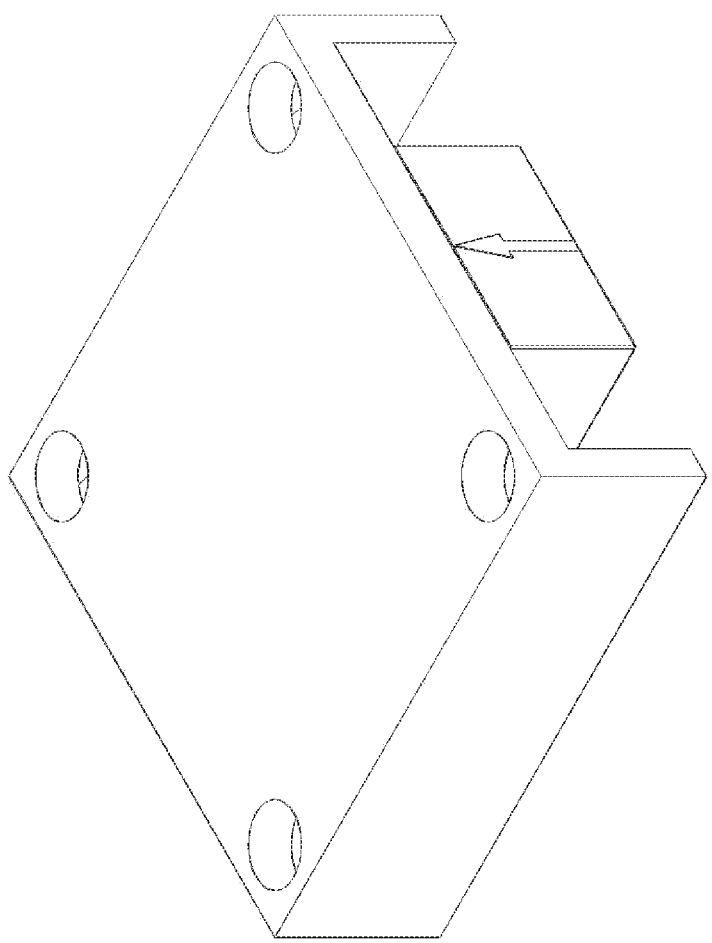
Figure 5. Vehicle with only a single magnet in the magnet array.

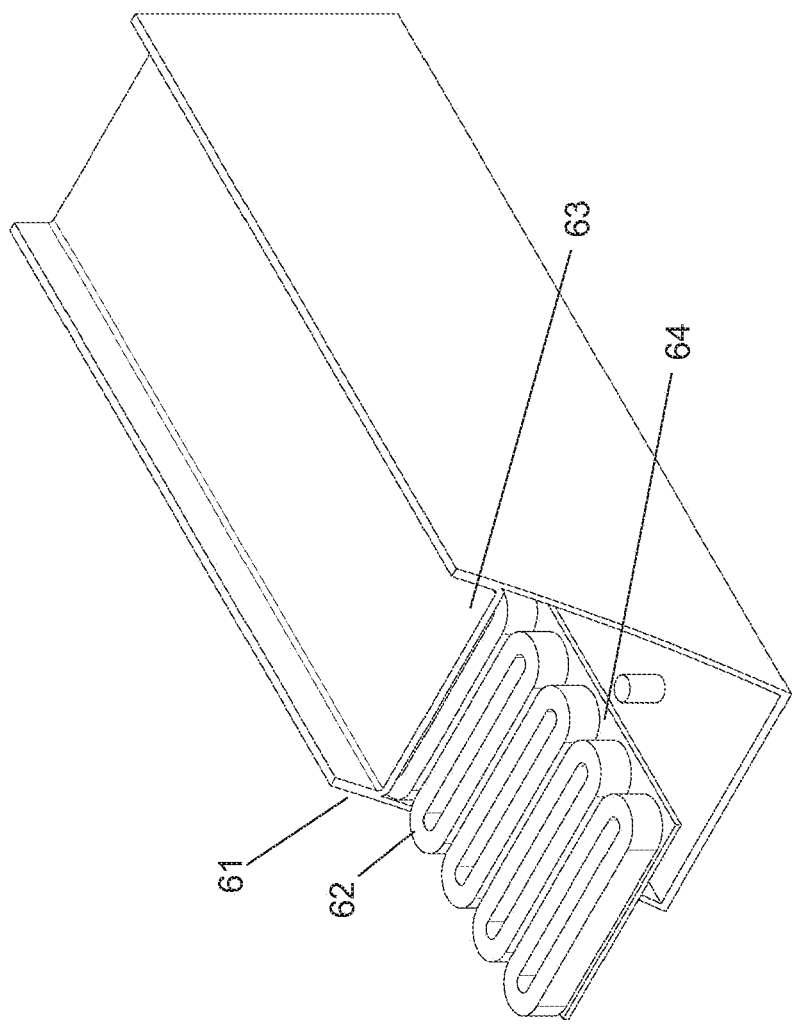
Figure 6. Cutaway housing showing coils mounted close to guideway surface.

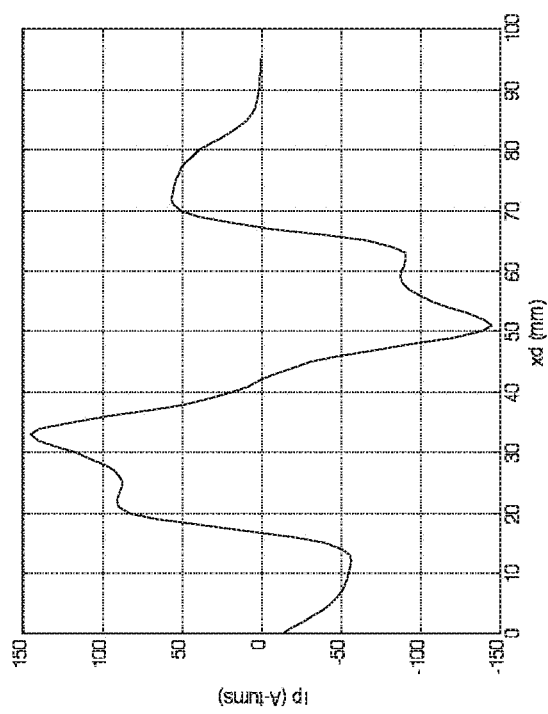
Figure 7. Typical waveform of current in a coil as a vehicle moves by.

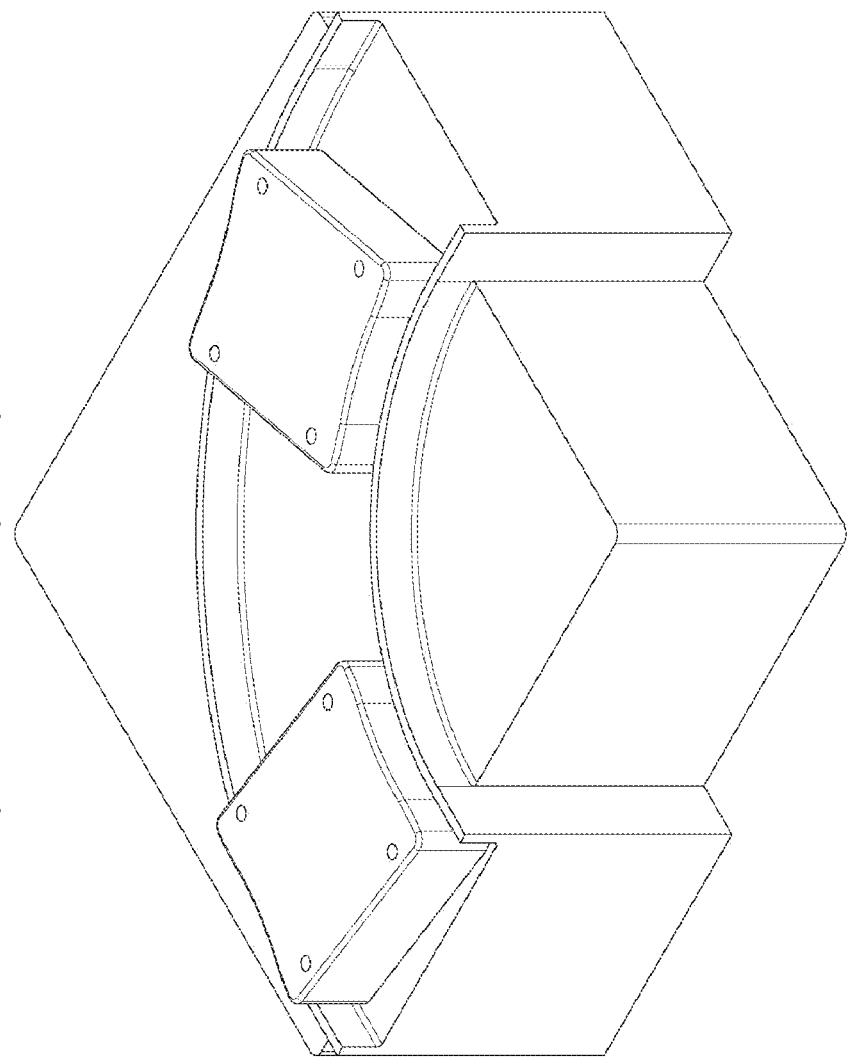
Figure 8. Vehicles negotiating a 90° turn.

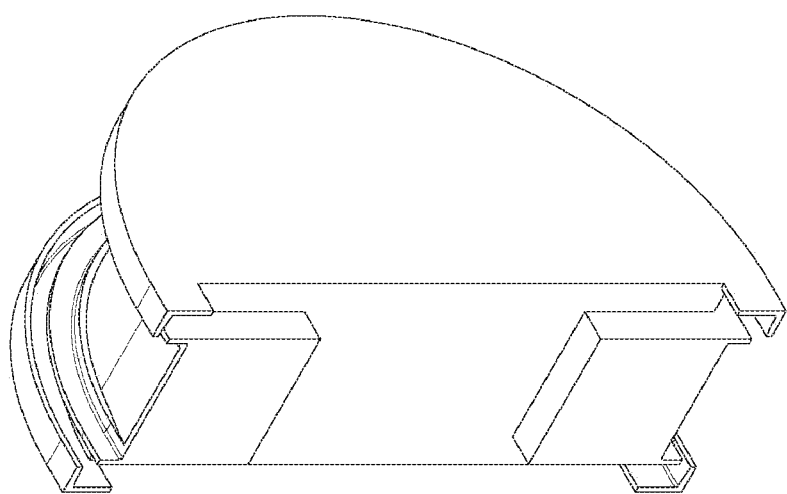
Figure 9. Vehicles negotiating a 180 vertical turn.

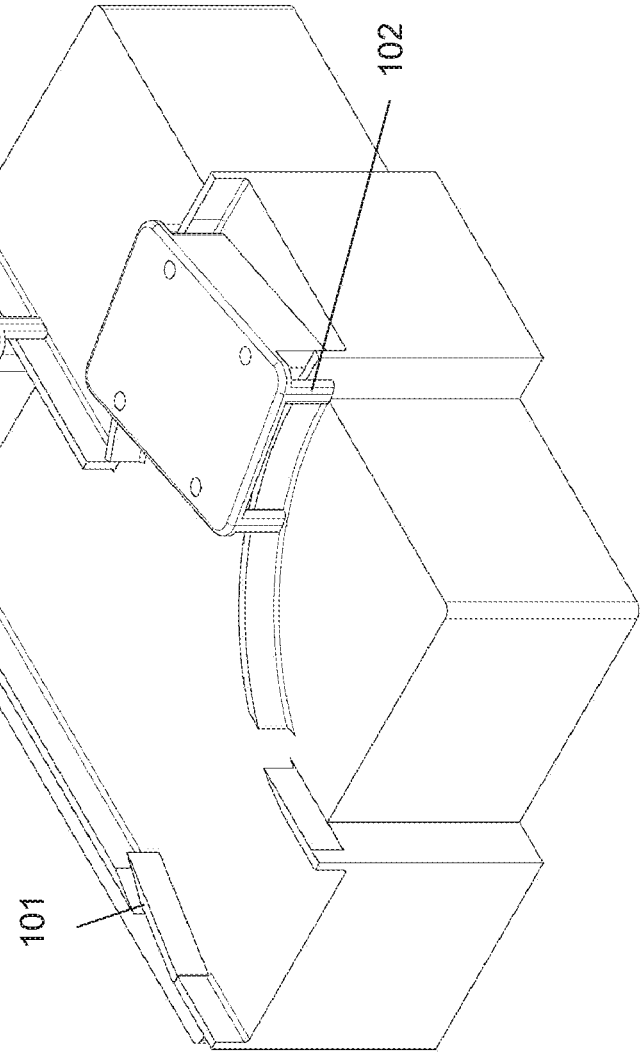
Figure 10. Right diverge showing flippers for controlling direction.

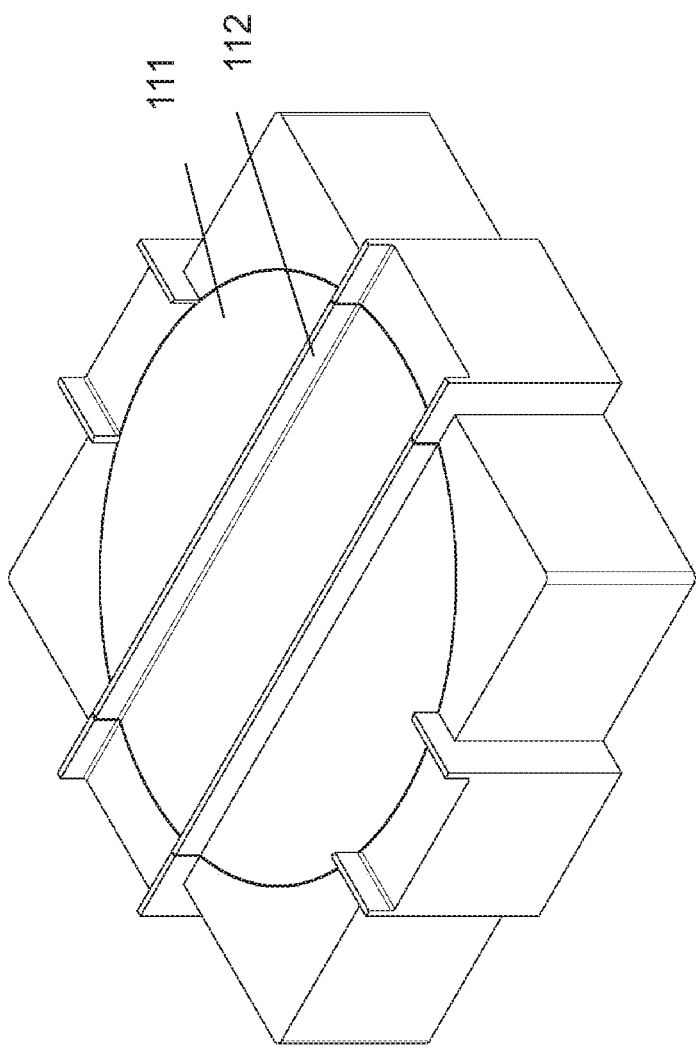
Figure 11. Turntable for turning, merging and diverging.

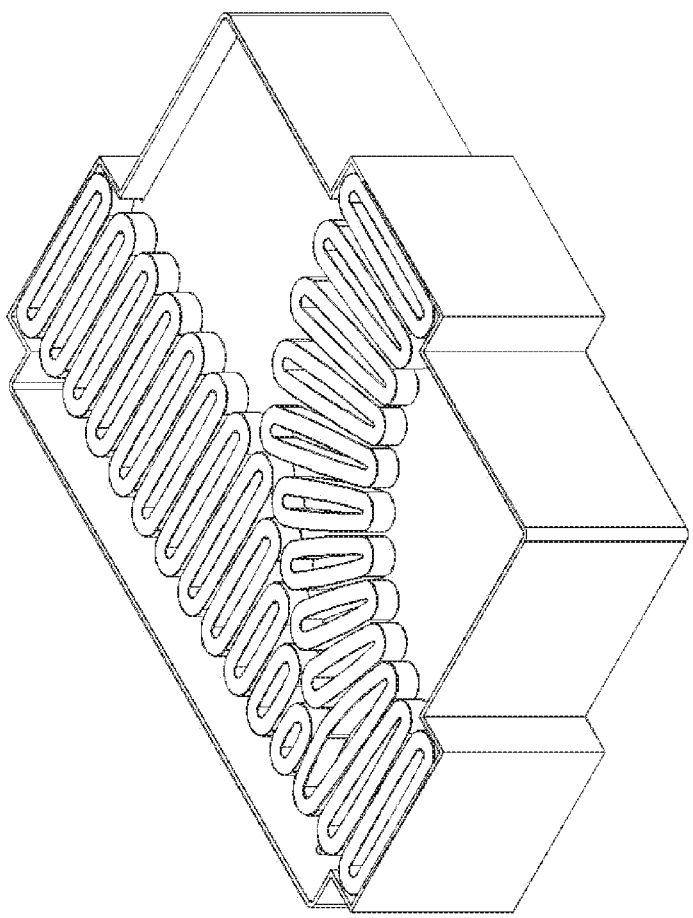
Figure 12. Cutaway view of right diverge showing coils for continuous propulsion

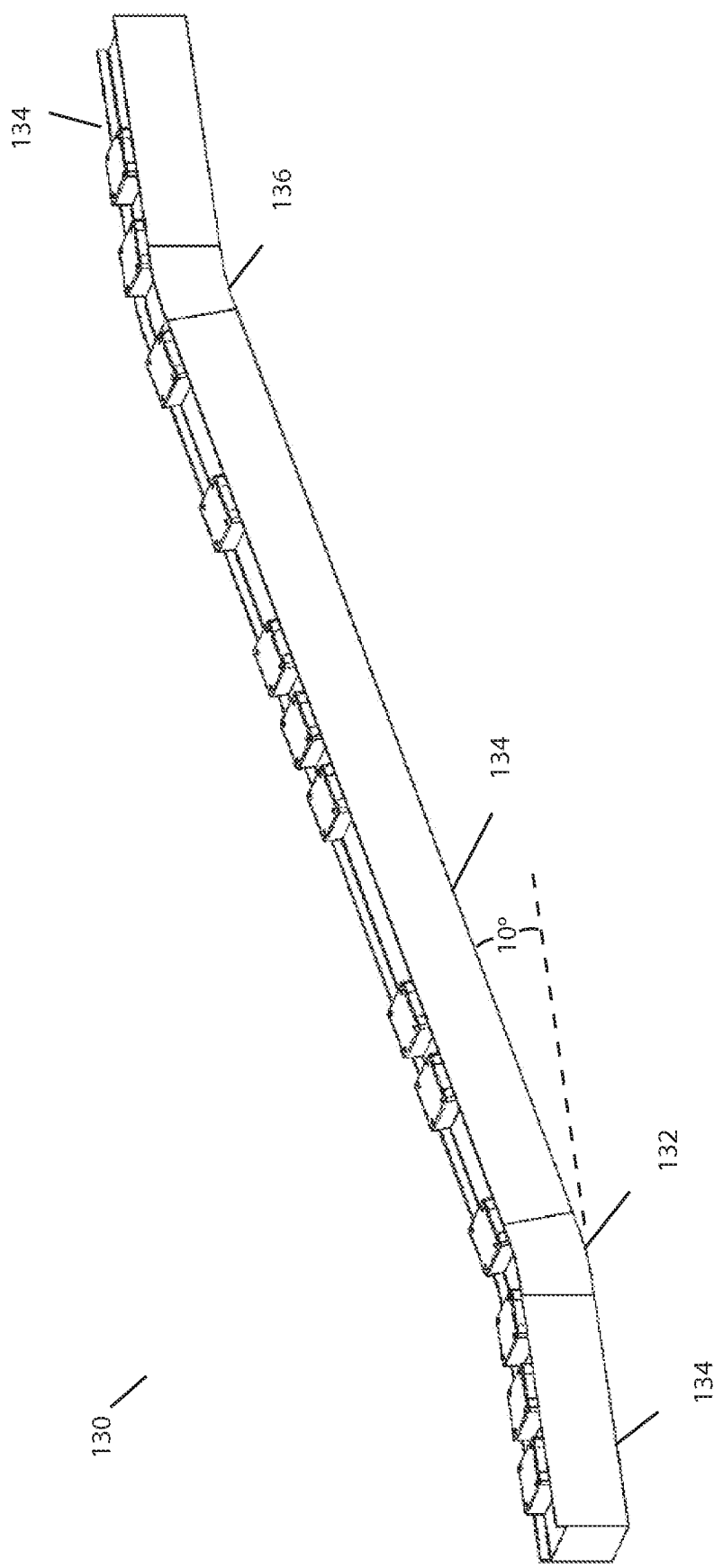
Figure 13. Vertical transition with convex and concave transition pieces

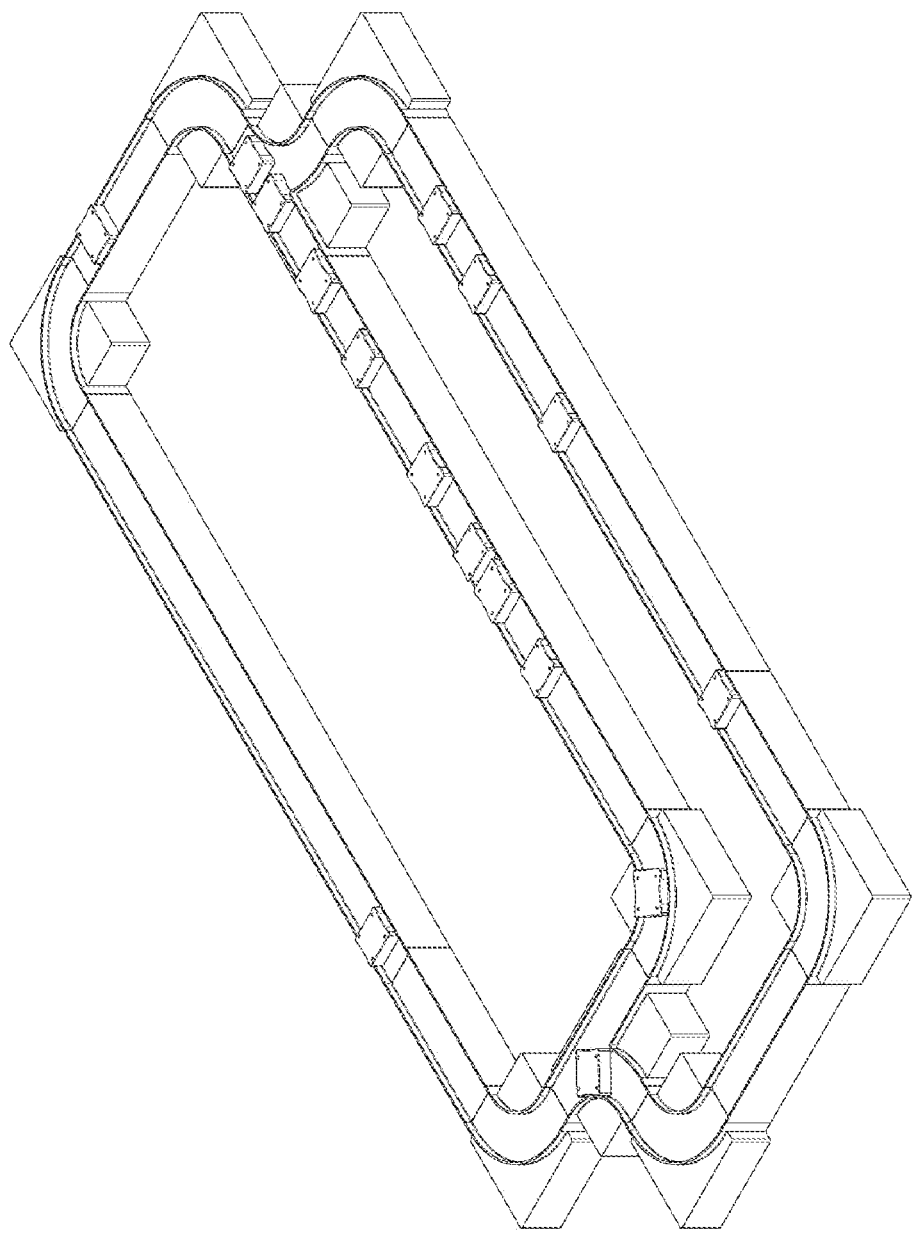
Figure 14. Example of layout showing use of guideway modules.

TRANSPORT SYSTEM POWERED BY SHORT BLOCK LINEAR SYNCHRONOUS MOTORS

CROSS-REFERENCE TO RELATED APPLICATIONS

This application is a continuation of U.S. patent application Ser. No. 15/096,974, filed Apr. 12, 2016, entitled "Transport System Powered by Short Block Linear Synchronous Motors," which is a continuation of U.S. patent application Ser. No. 14/143,802, filed Dec. 30, 2013, now U.S. Pat. No. 9,346,371, issued May 24, 2016, entitled "Transport System Powered by Short Block Linear Synchronous Motors," which is a continuation of U.S. patent application Ser. No. 12/359,022, filed Jan. 23, 2009, now U.S. Pat. No. 8,616,134, issued Dec. 31, 2013, entitled "Transport System Powered by Short Block Linear Synchronous Motors," all of which are herein incorporated by reference.

BACKGROUND OF THE INVENTION

The invention pertains to transport systems and more particularly, by way of example, to guideway-based transport system with short block linear synchronous motors. The invention has application, by way of non-limiting example, in production lines, laboratories and other applications requiring complex guideways, sharp turns, merge and diverge switching, and/or inverted operation.

There are many types of transport systems that can move objects on a guideway. Examples include: wheel-suspended vehicles propelled by rotary or linear motors, maglev or air-cushion suspended vehicles propelled by linear motors or cables, vehicles that move in tubes propelled by air pressure, vehicles supported or guided by bearings, and vehicles that are moved on conveyor belts. Existing transport systems have many useful applications but there are opportunities for substantial improvement, for example, in the precise movement of relatively small and closely spaced objects on a complex guideway.

Small and medium size objects are often transported on conveyor belts because this eliminates the need for wheels or other mechanisms to suspend, guide and propel the objects. Belt transport systems are relatively inexpensive but they lack precise control that is often needed and they require substantial maintenance because of many moving parts. Other approaches to low cost transport include air propelled vehicle moving in tubes and the use of gravitational forces to move objects down an incline, but these approaches have even less precise control.

The advantages of using linear synchronous motor (LSM) propulsion are well known and described in other patents (by way of non-limiting example, U.S. Pat. Nos. 7,458,454, 7,448,327, 6,983,701, 6,917,136, 6,781,524, 6,578,495, 6,499,701, 6,101,952, and 6,011,508, all assigned to the assignee hereof and the teachings of all of which are incorporated herein by reference), but in many cases, particularly, for example, when moving small and closely spaced objects, the LSM can be more expensive and provide less throughput than competing propulsive systems.

In view of the foregoing, an object of the invention is to provide improved transport systems, apparatus and methods.

A related object of the invention is to provide such systems, apparatus and methods as take advantage of LSM technologies.

Another related object of the invention is to provide such systems, apparatus and methods as are adapted for transport of small objects and/or medium-sized objects.

A further related object of the invention is to provide such systems, apparatus and methods as are adapted for use with closely-spaced objects.

Still another object of the invention is to provide such systems, apparatus and methods as are adapted for use in production lines, laboratories and other applications requiring complex guideways, sharp turns, merge and diverge switching, and/or inverted operation.

SUMMARY OF THE INVENTION

The foregoing are among the objects attained by the invention, which provides in some aspects an LSM-based transport system that includes a guideway with a plurality of coreless propulsion coils disposed along a region in which one or more vehicles disposed on the guideway are to be propelled, as well as electronic power and control circuitry that excites the propulsion coils independently so as to propel the vehicles along the guideway. The vehicles, according to these aspects of the invention, each include a magnetic flux source—for example, one or more Halbach or other magnet arrays.

Systems according to the foregoing aspect are advantageous for, among other reasons, that the vehicles on the guideway can be moved (or propelled) independently of one another in a controlled fashion—e.g., without risk of collision or uncontrolled motion—regardless of their proximity to other vehicles on the guideway.

Related aspects of the invention provide transport systems as described above in which the vehicles are disposed for sliding motion along guideway. In these aspects, the vehicles can have a low coefficient of friction with the guideway, e.g., a coefficient of friction of less than substantially 0.2.

The guideway, according to related aspects of the invention, can include guidance structure—such as rails—that facilitate maintaining the vehicles on the guideway (or, put another way, that inhibit the vehicles from moving off the guideway).

In related aspects of the invention, the guideway of transport systems of the type described above is made up of a plurality of coupled (e.g., interlocked) modules. The propulsion coils may be mounted in those modules and more particularly, according to some aspects of the invention, on printed circuit boards that make up the modules. The coils are disposed within the modules so as to be in close proximity to magnet arrays (or other flux sources) of vehicles passing over them.

In still other related aspects, the invention provides transport systems as described above in which the modules comprise power controllers that form part of the electronic power and control circuitry and that are selectively electrically coupled to one or more of the propulsion coils, e.g., of the respective modules. Microprocessor(s) and/or switches can also be provided to provide electrical coupling between the power control circuitry and the propulsion coils.

Yet still other aspects of the invention provide transport systems as described above in which the guideway comprises merge and/or diverge regions, each of which may include mechanically and/or magnetically actuated switches to alter the course of passing vehicles. These merge and diverge regions, as well as straight-away regions, that make up the guideway may comprise one or more of the aforementioned coupled modules.

Further related aspects of the invention provide transport systems as described above in which at least one of the diverge regions comprises a plurality of coreless propulsion coils spaced along a region in which the course of passing vehicles is altered—that is, spaced along a corner, curve and/or branch—so as to propel the vehicles through the diverge. According to related aspects of the invention, a merge region can be similarly equipped with a plurality of such coils.

Other aspects of the invention provide guideways, guideway modules and vehicles for use thereon, constructed and/or operated as discussed above.

BRIEF DESCRIPTION OF DRAWINGS

A more complete understanding of the invention may be attained by reference to the drawings, in which:

FIG. 1 depicts a system according to the invention, including a straight guideway and vehicles propelled thereon by an LSM in close proximity while sliding on a low friction guideway surface and guided by rails on the side of the guideway.

FIG. 2 shows details of a vehicle according to one practice of the invention used to hold objects for moving on the guideway in FIG. 1.

FIG. 3 shows vehicle guidance mechanisms and magnet array in a system according to one practice of the invention.

FIG. 4 is similar to FIG. 3 but with a Halbach Array for the magnets.

FIG. 5 is similar to FIG. 3 but with a single magnet used for propulsion.

FIG. 6 shows a guideway according to one practice of the invention, including a printed circuit board, with propulsion coils mounted on it, in close proximity to the guideway surface, and connected to power control circuitry on the circuit board.

FIG. 7 shows a typical waveform of current in a coil as a vehicle moves by in a system according to one practice of the invention.

FIG. 8 shows vehicles negotiating a sharp 90° horizontal turn in a system according to one practice of the invention.

FIG. 9 shows vehicles negotiating a sharp 180° vertical turn in a system according to one practice of the invention.

FIG. 10 shows a right diverge in a system according to one practice of the invention with vehicle direction determined by the position of a small flipper.

FIG. 11 shows a turntable which can be used in a system according to one practice of the invention in lieu of a curve to effect diverge and merge operations.

FIG. 12 shows propulsion coils providing continuous force on vehicles moving on a right diverge module of a system according to the invention.

FIG. 13 shows a vertical transition in a system according to one practice of the invention.

FIG. 14 shows an example of a system according to the invention.

DETAILED DESCRIPTION OF THE ILLUSTRATED EMBODIMENT

Introduction

Described here is an LSM-based transport system that allows vehicles to move on a guideway that can be complex and that can include sharp horizontal and vertical turns, merge and diverge switching, and inverted operation. Examples of applications include: moving bottles on an assembly line while they are being filled and capped, moving vials in a laboratory for analysis, moving electronic devices along a production line so that robots can insert components, and sorting objects that arrive from a multiplicity of sources and must be delivered to appropriate locations. In some cases it is feasible to use wheels, bearing or other rolling elements to assist in suspension and guidance, but this invention can also be used in cases where there are no wheels (or other rolling elements) and the vehicles slide on a guideway surface. Wheel-less vehicles can be small and inexpensive when the objects to be moved are not too large. For heavier vehicles the same short block design is suitable for wheel- or bearing-based suspension and guidance.

The result is a transport system that provides an economically viable means of using LSM propulsion to propel and control closely spaced small to medium size vehicles on a guideway.

Among other aspects of the systems described herein are LSM motor modules that also function as the transport system track (or "guideway") pieces. A selection of standard track building blocks fit together in a plug-and-play manner to form an almost endless variety of layout options. The motor modules (or "motors", for short) can contain not only the propulsion and intelligent routing elements, but also the guidance and structural support features to allow for rapid assembly and track configuration. The system is ideally suited, by way of non-limiting example, for environments requiring clean operation and/or wash down capability. It can also support "track and trace" requirements, as each vehicle can be uniquely identified and constantly tracked throughout the system.

A suspension system with a coefficient of friction obtainable with sliding motion can beneficially be used with an LSM with negligible attractive force. This is achieved, in the illustrated embodiment, by using a coreless motor with propulsion coils mounted, e.g., in close proximity to the vehicle magnets.

The text that follows describes components and operation of embodiments of the invention. It is understood that many variations on this design are possible and are contemplated by the invention, but this description shows how to achieve the foregoing and other objectives with a simple system that can be manufactured at a reasonable cost.

Guideway

FIG. 1 shows a straight section of guideway with vehicles 13 moving in close proximity. The structure of the guideway can provide guidance in one or more dimensions by rails 12 on the side. For applications where the vehicle does not have wheels they slide on the guideway surface and special materials (discussed below) are used to minimize friction. The guideway housing 11 contains all of the electronics including position sensing means, propulsion coils, power electronic components, and microprocessors.

The design shown in these Figures is based on vehicles that are about 50 mm wide and 50 to 60 mm long. For larger objects the guideway and vehicle dimensions can be scaled, much as model railroads have been constructed with a variety of scaling factors.

Vehicle

FIGS. 2 and 3 show a vehicle 21 that can be used as part of the proposed transport system. It is relatively small, about 50 mm square and 20 mm high, and has components 32 on the lower surface that slide on the guideway running surface. Holes 22 in the top of the vehicle are used to mount support mechanisms for the objects that are to be moved.

The vehicle has curved sides 23 that match the sides of a curved guideway so as to allow short radius horizontal turns. It is guided by the guideway and can move in a normal upright position when transporting an object as well as moving in an inverted position when not carrying an object. It can also negotiate vertical turns. Pins 24, 31 in the corners of the vehicle interact with mechanisms in the diverge and modules so as to control the direction of motion.

FIG. 3 is a view of the lower surface of the vehicle and shows the permanent magnets 33, 34 that are mounted near the bottom of the vehicle and provide the means for LSM propulsion.

FIG. 4 shows a variation of FIG. 3 in which a Halbach Array 44 is used for the magnet structure so as to create higher force for a given weight. FIG. 5 shows a single magnet structure 51 that is suitable for applications where less force is required.

Larger objects can be moved on this same guideway by using a double-bogey design, as has been used with conventional LSM designs (see, for example, U.S. Pat. No. 7,458,454, entitled "Three-dimensional Motion Using Single-Pathway Based Actuators," issued Dec. 2, 2008, and U.S. Patent Application 2007/0044676, entitled "Guideway Activated Magnetic Switching of Vehicles," published Mar. 1, 2007, the teachings of both of which are incorporated herein by reference), or by increasing the dimensions of guideway and vehicles.

Low Friction Sliding Surface

In order to reduce the required propulsive force and heating from friction, the vehicle and guideway of the illustrated embodiment are designed to minimize the coefficient of friction $c_f$, which is the ratio of the propulsive force needed to move the vehicle to the gravitational force of the vehicle on the guideway. In some cases wheels can be used as a way to reduce this force, but this invention allows the use of wheel-less vehicles. FIG. 6 shows the guideway with low friction surface 63 that supports vehicles in close proximity to the propulsion coils 64.

Examples of low friction for wheel-less applications include Teflon sliding on Teflon and Teflon sliding on stainless steel. Lower friction is possible if the surface can be lubricated by a thin film, but for many applications this is not allowable so the design assumes no lubrication. It is also preferable that the surface have good wear characteristics so, for example, we might use stainless steel on the guideway and Teflon on the vehicle with the expectation that there would be negligible wear on the steel but the vehicle might eventually need to have its sliding surface replaced, an action that is less expensive than replacing the guideway. Sliders 32 in FIG. 3 are examples of how low friction components can me mounted. They may be designed so as to be replaceable if it is expected that they will wear out before the vehicle reaches end of life.

With some designs $c_f$ can be as low a 0.1 but more practical values are in the range 0.15 to 0.2. Because this is a relatively high value it is preferred that the propulsive force not create substantial downward force on the vehicle. A typical LSM using ferromagnetic material will exert an attractive force that is four to six times the propulsive force and with this much attractive force the vehicle may not be able to move, or if it did move there would be substantial heating and power wasted—in such instances, wheels, bearings or other rolling elements can be incorporated for suspension of the vehicles.

Magnet Array

There are many types of magnet arrays that can be used, one of which is shown in FIG. 3. With this design there is one middle magnet 33 that has the South pole on the lower surface and two half magnets 34 on the ends that have a North Pole on the lower surface. Typically the magnets use NdFeB in order achieve high fields but they can use other materials, such as ceramic when cost or external fields must be low or Samarium Cobalt when the operating temperature is high.

One design consideration is the interaction between magnets on adjacent vehicles. The ferromagnetic piece 35 largely prevents magnetic fields from adjacent vehicles from interfering with each other.

FIG. 4 shows a Halbach Array which can be used where higher force is required and the added cost is acceptable. With this design the magnetic field rotates from one magnet to the next with a resulting higher propulsive force than is possible with the magnet design in FIG. 3. Ferromagnetic shield 43 minimizes interactions between the fields of adjacent vehicles.

FIG. 5 shows a single magnet providing all of the magnetic flux with ferromagnetic material on the ends used to provide a return path. This may not produce as much force but can be less expensive than multi-magnet designs.

Linear Motor Propulsion

FIG. 6 shows coils 64 mounted in close proximity to the guideway running surface 63. Currents in these coils are individually controlled via power electronic components and microprocessors so that each vehicle can be individually controlled even when it is touching neighboring vehicles.

A feature of the illustrated embodiment is the lack of ferromagnetic material that is commonly used in an LSM to make it more efficient. With no ferromagnetic material we can not achieve as high a force, but we can limit the attractive force to a small fraction of the propulsive force and thereby allow strong acceleration and braking forces to move the vehicle when the coefficient of friction is on the order of 0.2 or higher.

In embodiments that use wheel-based vehicles the friction force may be small enough that some ferromagnetic material can be used in the stator so as to achieve higher propulsive force.

Software for controlling the microprocessors can be similar to control software used on LSM designs with blocks that are several coils long. Here, however, position sensing components are located close enough together that they can identify individual vehicles even when the vehicles are touching. Such sensing facilitates control of the movement of the vehicles independently of one another on the guideway. Prior demonstrations of locally commutated LSMs have shown that this software does not require special features.

PC Board Mounted Coils and Control Circuitry

The illustrated embodiment permits the control of each coil individually without the cost associated with conventional designs. With reference to FIG. 6, there is shown an embodiment in which the coils 62 are mounted directly on a Printed Circuit Board (PCB) 64. This board supports the coils and provides connections between the coils and the power electronic modules that control the current. Typically each coil is connected to the output of an "H-bridge" with MOSFET or IGBT devices used to control the amount and direction of current in each coil. These components are mounted on the same PCB. The PCB also holds Hall Effect devices that sense the magnetic field produced by the vehicle and allow a microprocessor to create a desired force. FIG. 7 shows a typical waveform of the current in a propulsion coil that will propel a vehicle as it moves by the coil. By proper choice of waveform several propulsion coils can work in unison to create a constant force on the vehicle with minimum power loss in the coil. For braking the sign of the current is reversed.

By mounting the coils directly on a PC board and by using integrated power controllers it is possible to reduce the cost for the coils and electronics. One microprocessor can control a multiplicity of H-bridges but with a coil spacing on the order of 16 mm there can be more than a dozen microprocessors per meter of motor, and the operation of these motor controllers must be coordinated by a higher level "node" controller. With modern semiconductor technology, and for low to moderate power levels, all of these components can be mounted on only one or two PCBs that are contained in the motor housing.

Guideway Modules

The guideway is built of modules much as a model train layout is constructed from modules. FIGS. 6, 8-11 and 13 show examples of a straight section, a 90° horizontal curve, a 180° vertical curve, a right diverge switch, a turntable, and a vertical transition. These components can be interconnected in a variety of ways to meet the requirements of many and diverse applications.

The 180° vertical curve in FIG. 9 is primarily used as a means to return empty vehicles to a starting point and vehicles negotiating this curve may be controlled and propelled by other means than an LSM. For example, vehicles going down may be propelled by gravity and vehicles going up may be propelled by interaction with a mechanical mechanisms and in both cases there may not be precise control during the curve transition. It is preferable that once the vehicles have negotiated this curve precise control is regained. In some cases there is a vertical curve with a much larger curve radius, such as used as a transition between a level guideway and an inclined guideway. (See, for example, FIG. 13). In this case LSM propulsion can be used for the vertical curve and thereby retain precise control through the curve.

FIG. 9 shows a right diverge using a small mechanical or magnetic flipper 101 that directs a moving vehicle to go either straight ahead or diverge to the right. The flipper is controlled by a linear or rotary actuator that interacts with pins 102 on the vehicle to steer the vehicle in the correct direction. The same device can be used to merge two streams of vehicles. The flipper is small and light so it can move from one position to another in a small fraction of a second and thereby allow high throughput with adjacent vehicles able to be switched independently. A left diverge can be constructed as a mirror image of the right diverge.

FIG. 11 shows a turntable 111 as an alternative to the flipper. Guidance rails 112 on the turntable and propulsion coils, not shown, guide and propel the vehicle. The turntable in FIG. 11 can rotate in 90° increments, but other designs can support motion for a variety of angles. The turntable tends to be slower than the flipper because of the added mass, but is less expensive for some applications and has greater versatility because it can be used in lieu of curves as well as to reverse vehicle direction and switch between a multiplicity of tracks.

FIG. 13 depicts a vertical transition 130. In the illustrated embodiment, this includes a concave transition piece 132, straight sections 134 and a convex transition piece 136, coupled as shown. The illustrated transition is 10° along the vertical axis, though, in other embodiments greater or lesser angles may be employed. Although the angle of the vertical transition shown here is established by transition pieces 132, 136, in other embodiments the transition may be defined by other pieces (e.g., incorporated into diverges, straight-sections, and so forth).

The switching function can also be provided by magnetic forces acting on the vehicle. For example, coils on and near the guideway can be controlled so as to create lateral forces that will perform the switching function. This approach to switching is described in U.S. Patent Application US 2007/0044676, entitled "Guideway Activated Magnetic Switching of Vehicles," the teachings of which are incorporated herein by reference.

FIG. 12 shows a cutaway view of a guideway diverge module showing propulsion coils for propelling vehicles on either of two paths. This continuous propulsion through a diverge or merge is essential to providing precise position control at all times.

A further appreciation of techniques for packaging the linear motor and other module components of the guideway modules may be attained by reference to U.S. Pat. No. 6,578,495, entitled "Modular Linear Motor Tracks and Methods of Fabricating Same," assigned to the assignee hereof, the teachings of which are incorporated herein by reference.

Application Example

There are many possible applications but the simple layout in FIG. 14 shows how the guideway modules can be interconnected. Vehicles move around the main loop but can move though a bypass when desired. Typical applications will use many more guideway modules than in this simple example.

Described above are systems, apparatus and method meeting the foregoing objects, among others. It will be appreciated that the embodiments illustrated and discussed herein are merely examples of the invention and that other embodiments, incorporating changes thereto, fall within the scope of the invention. Thus, by way of non-limiting example, the invention can be practiced with embodiment in which suspension is provided by air-cushion and fluid-cushion, e.g., in addition to the wheelless, wheeled, and other roller-based designs discussed above, of which we claim:

The invention claimed is:

1. A linear motor system comprising:
   a plurality of track sections forming at least one continuous track and having propulsion coils energizable to produce magnetic flux;
   a diverge location in which the coils divert in first and second directions;
   a plurality of vehicles disposed on and movable along the at least one continuous track, each vehicle having a magnetic flux source that interacts with magnetic flux of the propulsion coils to propel the vehicle along the at least one continuous track; and
   control circuitry coupled to the propulsion coils that, in operation, energizes the propulsion coils to control the vehicles independently of one another, and to change a movement of the vehicles from the first direction to the second direction at the diverge location only by magnetic forces acting on the vehicles.

2. The system of claim 1, wherein the propulsion coils comprise coreless propulsion coils.

3. The system of claim 1, wherein the propulsion coils are mounted on one or more printed circuit boards.

4. The system of claim 1, wherein at least one of the plurality of track sections comprises a guidance structure configured to inhibit the plurality of vehicles from moving off the continuous track.

5. The system of claim 1, wherein at least one of the plurality of vehicles comprises a guidance structure configured to inhibit the plurality of vehicles from moving off the continuous track.

6. The system of claim 1, comprising one or more position sensors configured to monitor a position of one or more of the plurality of vehicles moving along at least one of the plurality of track sections.

7. The system of claim 1, comprising a merge location in which the coils merge from third and fourth directions.

8. The system of claim 1, comprising one or more switching devices, controlled by one or more microprocessors, coupled between the propulsion coils and the control circuitry, wherein the one or more switches provide electrical coupling between the control circuitry and the propulsion coils.

9. The system of claim 8, comprising software for controlling the one or more microprocessors, wherein the software generates commands for controlling currents through the propulsion coils synchronized to motion of the plurality of vehicles.

10. A linear motor system comprising:
a plurality of track sections forming at least one continuous track and having propulsion coils energizable to produce magnetic flux;
a diverge location in which the coils divert in first and second directions; and
control circuitry coupled to the propulsion coils that, in operation, energizes the propulsion coils to control a plurality of vehicles moveable along the track independently of one another, and to change a movement of the vehicles from the first direction to the second direction at the diverge location only by magnetic forces acting on the vehicles, wherein each vehicle having a magnetic flux source that interacts with magnetic flux of the propulsion coils to propel the vehicle along the at least one continuous track.

11. The system of claim 10, wherein the propulsion coils comprise coreless propulsion coils.

12. The system of claim 10, wherein the propulsion coils are mounted on one or more printed circuit boards.

13. The system of claim 10, wherein at least one of the plurality of track sections comprises a guidance structure configured to inhibit the plurality of vehicles from moving off the continuous track.

14. The system of claim 10, comprising one or more position sensors configured to monitor a position of one or more of the plurality of vehicles moving along at least one of the plurality of track sections.

15. The system of claim 10, comprising a merge location in which the coils merge from third and fourth directions.

16. The system of claim 10, comprising one or more switching devices, controlled by one or more microprocessors, coupled between the propulsion coils and the control circuitry, wherein the one or more switches provide electrical coupling between the control circuitry and the propulsion coils.

17. The system of claim 16, comprising software for controlling the one or more microprocessors, wherein the software generates commands for controlling currents through the propulsion coils synchronized to motion of the plurality of vehicles.

18. A method, comprising:
energizing a first subset of a plurality of propulsion coils of a track section to direct a first vehicle of a plurality of vehicles along the track section independently of the other vehicles of the plurality of vehicles, wherein the track section is combinable with one or more other track sections to form a continuous track;
monitoring a position of the first vehicle along the track section; and
at a diverge location in which the coils divert in first and second directions, energizing a second subset of the plurality of propulsion coils of the track section to change a movement of the first vehicle from the first direction to the second direction at the diverge location of the track section only by magnetic forces acting on the first vehicle.

19. The method of claim 18, wherein the propulsion coils comprise coreless propulsion coils.

20. The method of claim 18, wherein the propulsion coils are mounted on one or more printed circuit boards.

* * * * *